United States Patent [19]

Besson et al.

[11] Patent Number: 4,562,375

[45] Date of Patent: Dec. 31, 1985

[54] PIEZOELECTRIC TRANSDUCER, NOTABLY FOR PRESSURE MEASUREMENT

[75] Inventors: Raymond J. Besson; Jean-Jacques Boy, both of Besançon; Jean-Pascal Valentin, Pouilley-les-Vignes, all of France

[73] Assignee: Schlumberger Technology Corporation, New York, N.Y.

[21] Appl. No.: 520,290

[22] Filed: Aug. 4, 1983

[30] Foreign Application Priority Data

Aug. 5, 1982 [FR] France ................ 82 13745

[51] Int. Cl.$^4$ ........................................... H01L 41/08
[52] U.S. Cl. ........................... 310/338; 310/346; 310/350; 310/361; 310/367; 310/369; 73/703; 73/708
[58] Field of Search ............... 310/338, 346, 367, 349, 310/350, 361, 369; 73/517 AU, 702, 703, 708, 754

[56] References Cited

U.S. PATENT DOCUMENTS

| | | | |
|---|---|---|---|
| 3,339,091 | 8/1967 | Hammond et al. | 310/346 |
| 3,561,832 | 2/1971 | Karrer et al. | 310/338 |
| 3,617,780 | 11/1971 | Benjaminson et al. | 310/346 |
| 3,805,097 | 4/1974 | Yanchich | 310/346 X |
| 4,079,280 | 3/1978 | Kusters | 310/361 X |
| 4,135,108 | 1/1979 | Besson | 310/361 X |
| 4,144,747 | 3/1979 | Datwyler, Jr. | 310/338 X |
| 4,160,183 | 7/1979 | Kusters | 310/361 X |
| 4,419,600 | 12/1983 | Sinha | 310/338 X |
| 4,439,705 | 3/1984 | Corbett | 310/338 |
| 4,454,443 | 6/1984 | Lukaszek et al. | 310/369 |
| 4,485,323 | 11/1984 | Corbett | 310/338 |

FOREIGN PATENT DOCUMENTS 2415881 8/1979 France .

OTHER PUBLICATIONS

"The Temperature Dependence of the Force Sensitivity of AT-Cut Quartz Crystals," *Proc. 26th Ann. Freq. Control Symp.*, Jun. 1972, pp. 108–112.
"Analytical Calculation of Initial Stress Effects on Anisotropic Crystals: Application to Quartz Resonators", *Proc. 32nd Ann. Freq. Control Symp.*, Jun. 1978, pp. 169–179.
"The Force Frequency Effect in Doubly Rotated Quartz Resonators," by Ballato et al., *Proc. 31st Ann. Freq. Control Symp.*, Jun. 1977, pp. 8–16.
"Quartz Crystal Accelerometer Insensitive to Temperature Variation", by Onoe et al., *Proc. 31st Ann. Freq. Control Symp.*, Jun. 1977, pp. 62–70.
Design of High Performance SC Resonators, by R. Ward, Proc. 35th Ann. Freq. Control Symposium, USAERADCOM, Ft. Monmouth, N.J., May 1981.
The Linear Quartz Thermometer—a New Tool for Measuring Absolute and Difference Temperatures, by Benjaminson, Hewlett-Packard Journal, vol. 16, No. 7, Mar. 1965.
Calculations on the Stress Compensated (SC-Cut) Quartz Resonator, by Eer Nisse, 30th Ann. Symp. on Freq. Control, Jun. 2–4, 1976, Ft. Monmouth, N.J.

*Primary Examiner*—Mark O. Budd

[57] ABSTRACT

In a pressure transducer of the piezoelectric type, a resonator (10) is made up of a pellet (16) mounted inside an element designed to be subjected to the action of a pressure on its exterior face (18). The pellet (16) and the element (12) are cut in the same quartz block, using a cut which provides two vibration modes. The forces resulting from the external pressure are transmitted to the edge of the pellet (16) by connecting bridges (22, 23) whose orientation is chosen so that one of the vibration modes has maximum sensitivity to the forces while the other mode has a practically zero sensitivity.

19 Claims, 16 Drawing Figures

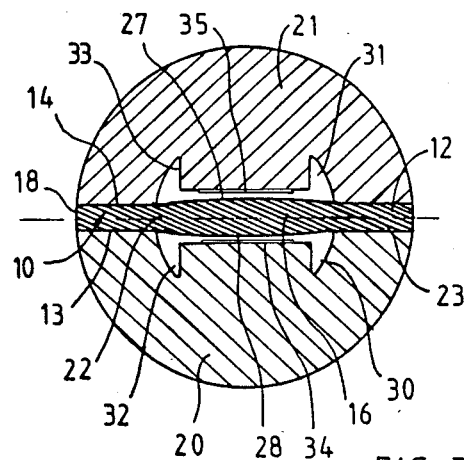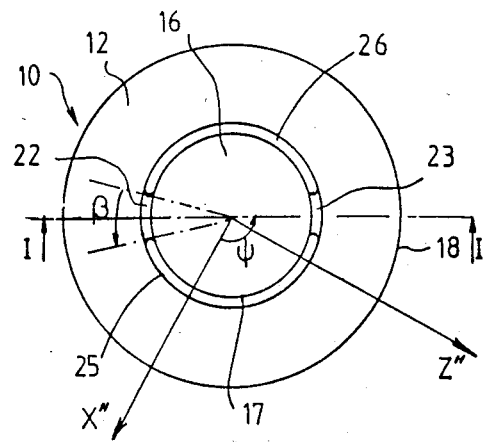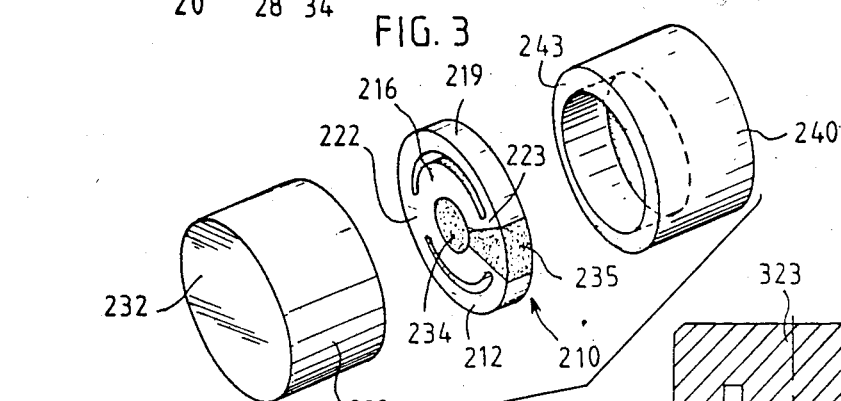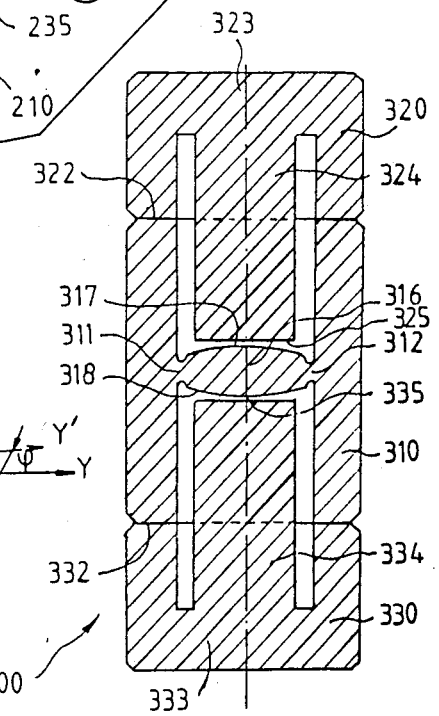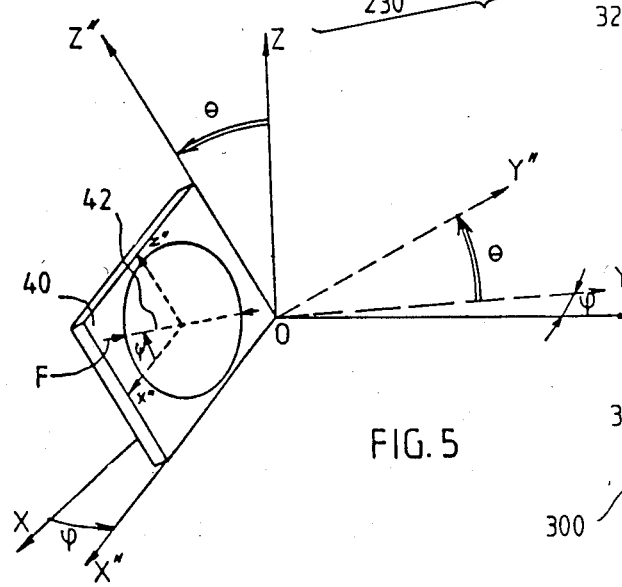

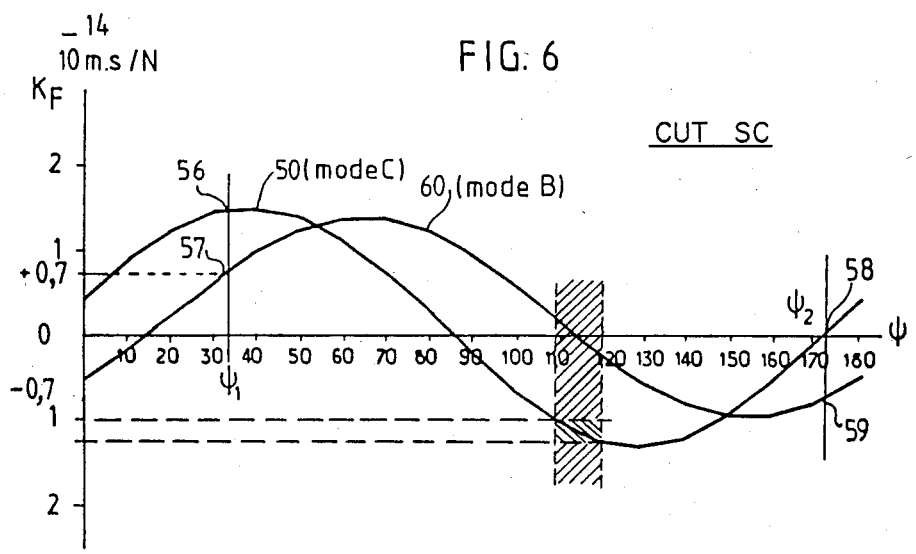
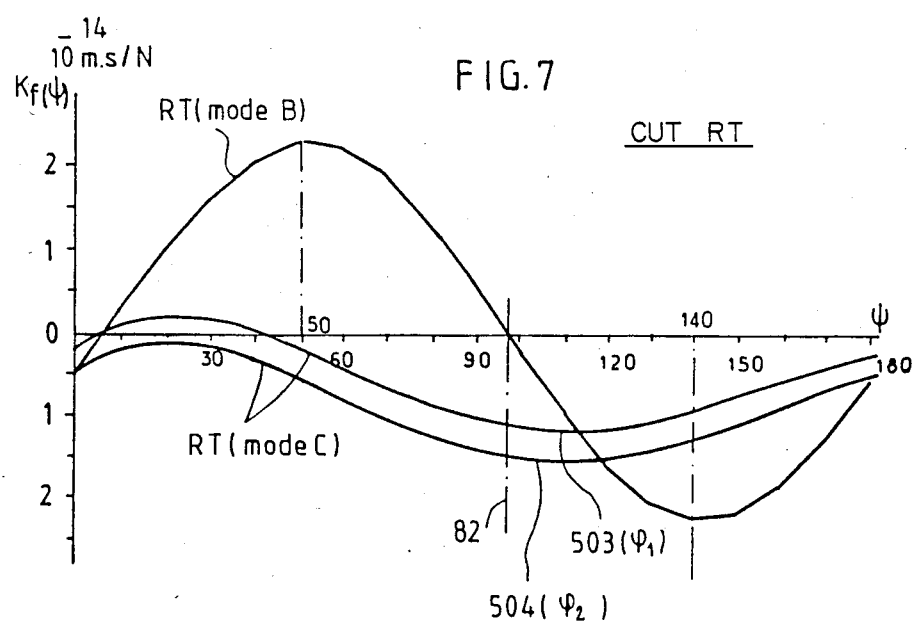

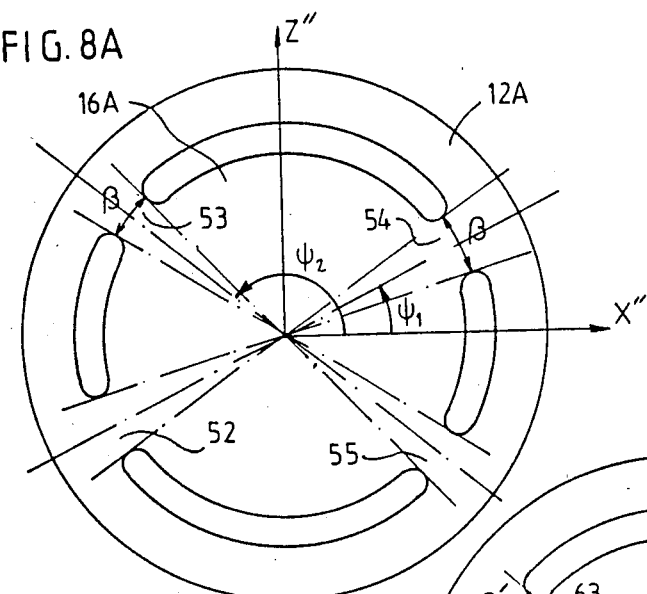
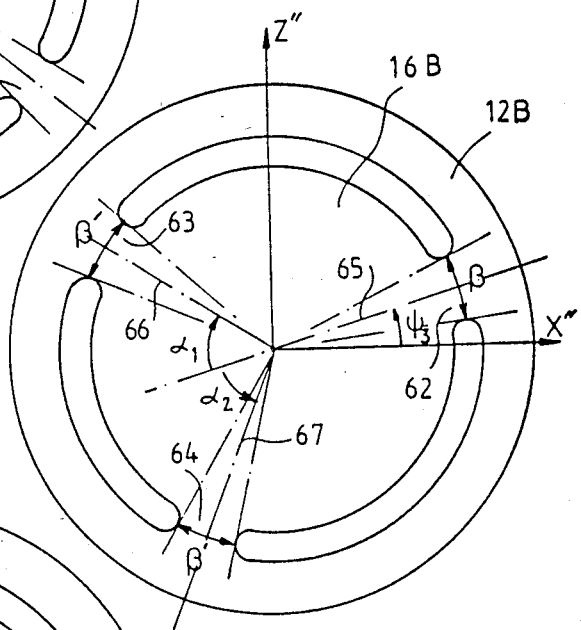
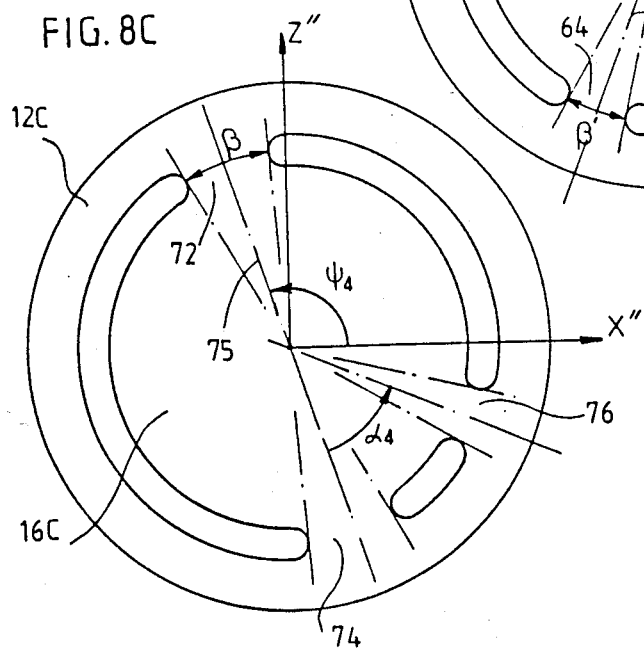

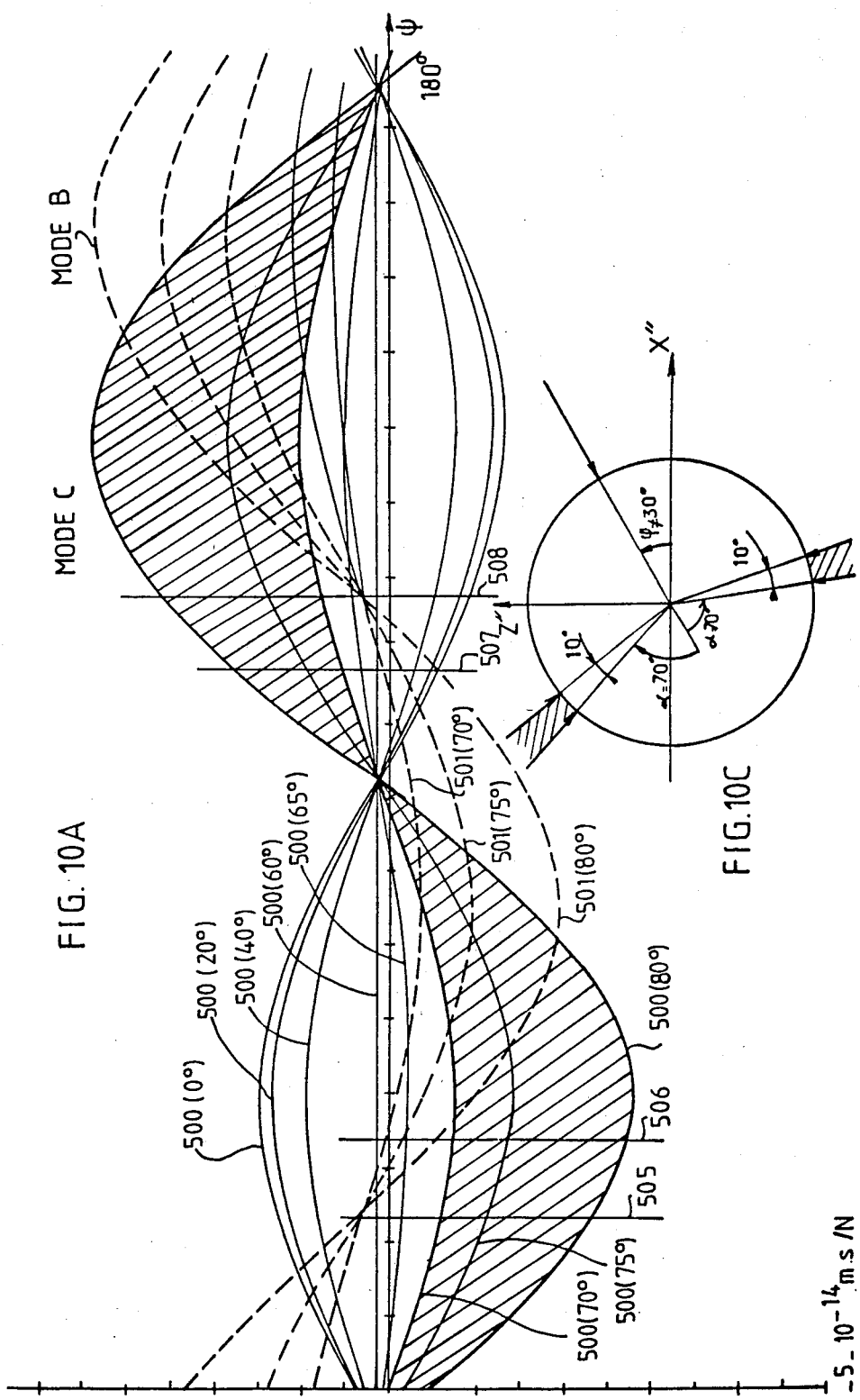

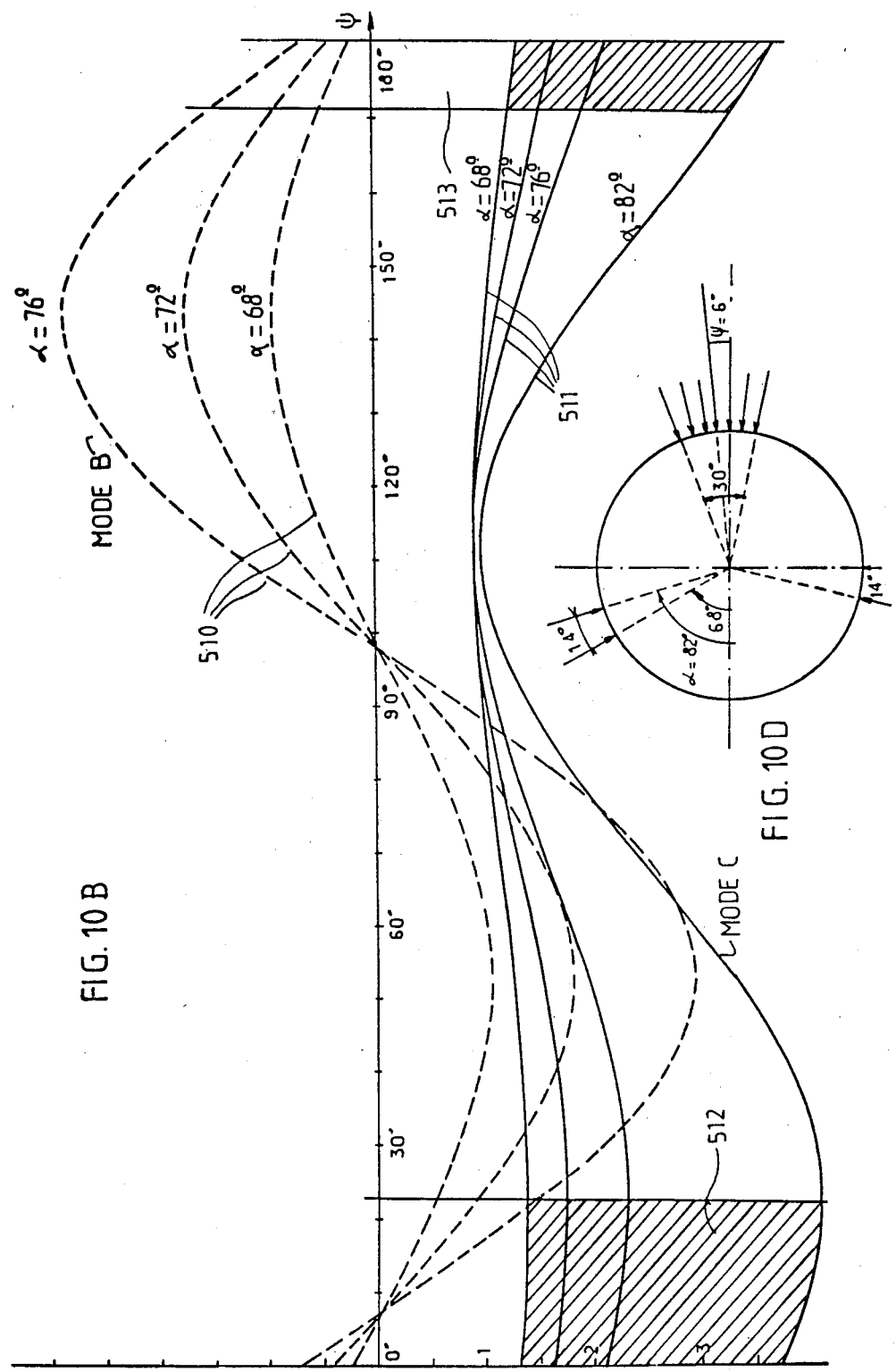

PIEZOELECTRIC TRANSDUCER, NOTABLY FOR PRESSURE MEASUREMENT

This invention relates to the measurement of pressures and in particular to temperature-corrected pressures. It applies notably to the measurement of fluid pressures in underground wells such as oil wells in production.

It is known that pressure measurements are of great importance for determining the producibility parameters of an oil well. In particular, it is essential to be able to detect relatively small variations in the pressure of the fluids produced at a given depth level, the interpretation of these variations making it possible to proceed with rational extraction of the petroleum resources from the well. Owing to the often great depth of the oil-bearing strata, the hydrostatic pressure in the well at the level of the strata can be very high. Values from 1000 to 1400 bars are currently reached. On the other hand, pressure variations to be detected can also be as small as $7 \times 10^{-4}$ bars. Consequently, the considered pressure measurements must be carried out with a relatively high accuracy.

Not only is it necessary to carry out pressure measurements in oil wells with a high degree of accuracy but use must also be made of transducers capable of supporting the particularly severe environment constituted by an oil well owing to the very depth of the wells, the often hostile environment in which they are located and, especially, the high temperature levels to which these transducers can be subjected at great depth. In addition to high accuracy, these transducers must consequently have a very high sensitivity to temperature variations, which may be considerable between two measurement points at different depths owing to the geothermal gradient.

The use of piezoelectric crystal resonators for pressure measurements in oil wells has already been proposed in the past. These devices in fact have the required pressure sensitivity properties. On the other hand, crystal resonators are extremely sensitive to temperature, variations of a few fractions of degrees Celsius generally being sufficient to distort significantly the pressure measurements made. To eliminate this drawback, one prior art design includes two identical crystal resonators mounted near each other in a sonde capable of being lowered into an oil well, one of these resonators being subjected to the pressure prevailing outside the sonde while the other is protected therefrom by a rigid casing and remains subjected to the reference pressure. Under these conditions, the frequency variations of the reference resonator are due only to the temperature variations. It is sufficient to combine the output frequencies of the reference resonator and of the measurement resonator to obtain a beat frequency which varies only with the pressure and, in principle, independently of the variations in the temperature around the sonde. These resonators can be made up, for example, of diaphragms or pellets arranged transversely within a cylinder. The cylinder and the diaphragm form part of the same crystal block. The pressure acting on the outside of the cylinder is transmitted by the latter to the periphery of the diaphragm. Such pressure transducers are described for example in Karrer, et al. U.S. Pat. No. 3,561,832.

The prior art device mentioned above however has the drawback of requiring two resonators which are necessarily separated from each other, so that temperatures variations affecting one of them do not necessarily affect the other at the same time. This drawback can take on sufficient proportions to disturb the efficiency of the measurement owing to the extreme temperature sensitivity involved, as indicated earlier.

This same drawback is present in a variant of U.S. Pat. No. 3,561,832, in which use is made of two resonator-diaphragm type cylinders joined end-to-end. In one of these cylinders, the diaphragm is attached to the internal wall of the cylinder by means of two diametrically opposite tongues whose direction makes it possible to obtain a maximum negative pressure sensitivity coefficient. The signals obtained at the output of the two resonators are combined to increase the pressure sensitivity of the resulting signal, while the temperature effects on the behavior of the two diaphragms tend to compensate each other. This however presupposes that the temperatures of the two diaphragms are identical. As already stated, such is not always the case, particularly in the case of fast temperature variations.

It is the object of the present invention to provide a piezoelectric resonator transducer capable of furnishing high accuracy measurements of both the pressure and the temperature of the resonator itself, notably for its application to measurements under the particular utilization conditions which characterize oil wells or geothermics.

For this purpose, the invention provides a pressure transducer comprising a piezoelectric crystal block including an external element, for example of annular section, whose exterior surface can be subjected to the pressure to be measured and a resonator pellet not subjected to the direct action of the pressure, for example with a mounting inside the annular element, and connected through its periphery to the external element to receive the forces corresponding to the pressure applied to this external element. Characteristically, the pellet is cut in the crystal so that the cut has a first and a second vibrating mode such as, for example, quasi-transverse vibrating modes. Its periphery is separated from the internal face of the external element by an interval along which are distributed connection bridges with the external element for the transmission to the pellet of the forces generated by the pressure in directions whose azimuths are selected in relation to at least one crystallographic axis of the cut (or its projection) so that the sensitivity of a resonance frequency of this pellet to these forces, chosen from among the possible resonance frequencies, is high in the first vibrating mode and practically zero in the second. The piezoelectric crystal cut can be a simple-rotation cut and, advantageously, a double-rotation or triple-rotation cut. Further, the operation summarized above is the preferred operation. The invention encompasses the use of any two frequencies chosen from among the fundamental or partial or anharmonic frequencies of the three vibrating modes of a piezoelectric crystal customarily designated by the letters A, B and C to which reference is made in greater detail below.

The invention is based upon the observation that in a crystallographic cut of a piezoelectric material such as a quartz crystal, and in particular in so-called double-rotation cuts, there are directions along which the resonance frequency of the crystal is more sensitive to a force applied along these directions than others. It is also based upon the observation that, in at least some of these cuts, it is possible to choose the direction of application of the forces on the pellet so that, according to at least one of the possible vibration modes, the frequency is practically insensitive to the intensity of these forces, thus making it possible to obtain a signal representative of the temperature variations only, with both high accuracy and high stability.

There are known methods (as for example described in Kusters, et al. U.S. Pat. No. 4,079,280 issued Mar. 14, 1978), for picking up, in a piezoelectric resonator, signals with a frequency resulting from two distinct vibration modes. One of these signals is used as a measurement of the internal temperature of the crystal and the other as a reference frequency. The signal providing the temperature measurement can be used to correct the measurements made by means of the other signal or to stabilize the frequency of the latter.

The present invention is distinguished from such techniques notably by the fact that, in the particular case of a pressure sensitive transducer, it is possible to obtain a signal which depends practically on only the temperature and not on the pressure by a suitable choice of the application direction(s) of the forces resulting from the pressure on the pellet of the resonator, by means of bridges. It is based in particular on the remarkable observation that it is possible, for such an application direction of the forces, to obtain good sensitivity of the other mode to their variations. It is thus possible to obtain high and even maximum sensitivity of the frequency to the value of the force one of the vibrating modes while it may be practically reduced to zero in the other. In particular, there are piezoelectric crystal cuts in which, by a suitable selection of the position of the bridges through which the forces resulting from the pressure are applied to the resonator pellet, one obtains a high sensitivity of the first mode to the force with sufficient reproducibility and stability to provide pressure measurements having the desired reliability, while the frequency variations of the second mode provide information on the temperature variations independent of the pressure. This information can be use to subsequently eliminate the influence of temperature variations on the pressure sensitive mode with high accuracy.

This accuracy results notably from the fact that there is no need to use an element outside of the pressure transducer to correct its temperature variation effects. These variations are in fact directly taken into account by a measurement on the same crystal but involving another vibrating mode.

In this regard, it is noted that the invention encompasses a temperature transducer comprising a block of piezoelectric material of the type mentioned earlier. When such a transducer is intended to be used in an environment in which it is subjected to variable stresses of external origin, the resonator pellet is connected to the external element by means of bridges which transmit to the resonator the forces resulting from these stresses in selected directions. The arrangement of these bridges is chosen so that the sensitivity of the resonance frequency of the pellet to the forces transmitted to it are practically zero in one of the vibrating modes of the pellet.

The invention can take on different embodiments as concerns both the choice of the cuts of the piezoelectric material making it possible to obtain the desired effect, and the number and arrangement of the bridges connecting the pellet to the external element transmitting the forces. In this regard, it notably provides arrangements in which it is possible to use either two bridges transmitting the forces along the same direction and in opposite directions, or two couples of such bridges oriented in directions which are aligned two by two, representing three bridges.

In addition, the invention lends itself readily to the use of arrangements capable of restricting the effects due to the aging of the material used as the resonator. In particular, it allows the application of arrangements known as BVA (improved aging casing).

Additional explanation and the description of nonlimitative embodiments are given below with reference to the appended drawings in which:

FIG. 1 represents a sectional view through a longitudinal plane I—I (FIG. 2) of a first embodiment of a transducer according to the invention;

FIG. 2 represents a plan view of the pellet of the resonator of FIG. 1;

FIG. 3 illustrates in perspective a second embodiment of a resonator;

FIG. 4 illustrates an embodiment of a pressure transducer;

FIG. 5 is a diagram in space illustrating the definition of the double-rotation cuts;

FIG. 6 is a frequency sensitivity diagram as a function of force application direction for two transverse vibration modes;

FIG. 7 is a similar diagram for another family of crystal cuts according to two different values of one of its angular parameters;

FIGS. 8A to 8C illustrate different arrangements for the bridges used to suspend a vibrating pellet from the pressure transmitting element;

FIGS. 10A and 10B represent two other force sensitivity diagrams for directions illustrated in FIGS. 10C and 10D;

Figure 9:
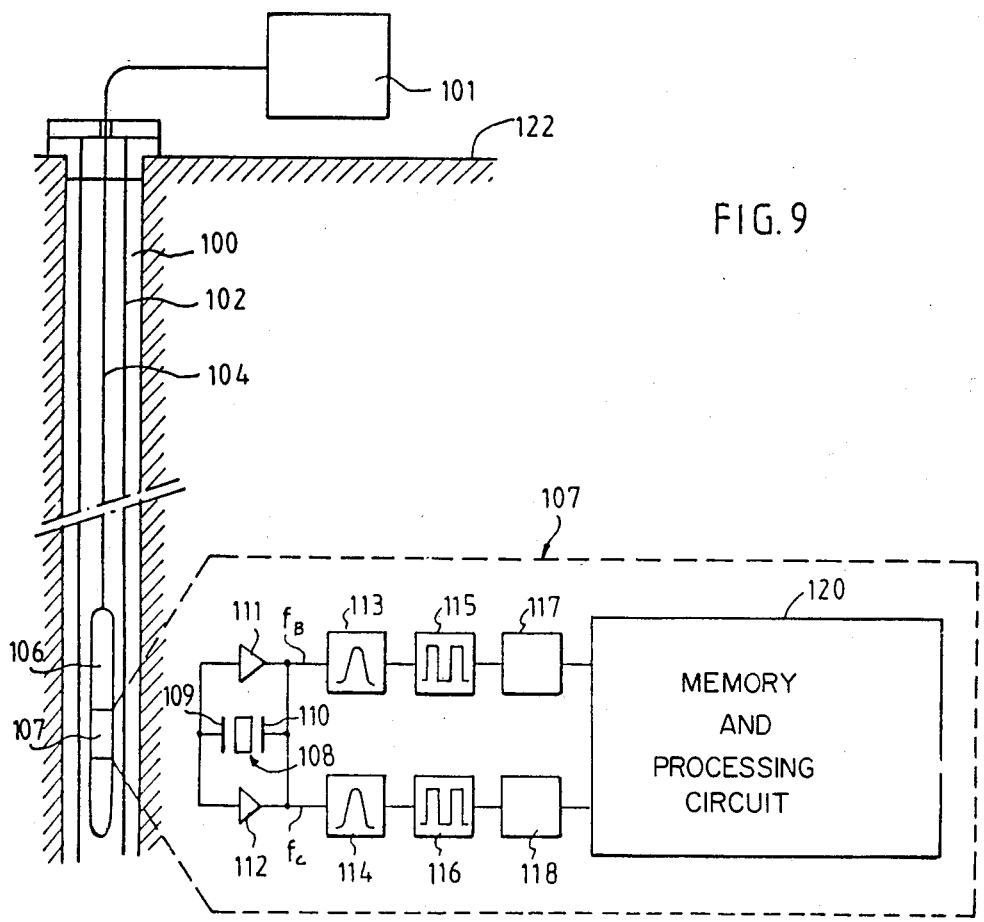
FIG. 9 illustrates the measurement circuits of a transducer in an oil well.

In FIGS. 1 and 2, a resonator comprises a monolithic circular quartz plate 10 comprising an element 12 of angular section which constitutes a cylindrical ring whose lower and upper faces 13 and 14 are kept between faces of corresponding form opposite two caps, a lower cap 20 and an upper cap 21, of hemispherical outer shape. The assembly of FIG. 1 is thus substantially in the form of a ball which can be mounted inside a sonde in a position in which the outer edge 18 of the plate 10 can be subjected to the pressure to be measured. It is of course possible to mount the transducer such that the entire external surface of the ball is subjected to the pressure. The two caps 20 and 21 are joined by means of an adhesive to this plate or by thermocompression using a prior metal deposit.

At its center, the plate 10 comprises a circular pellet 16 formed in the same crystal block as the ring 12 and connected to it by diametrically opposite elements or bridges of unitary construction 22 and 23 leaving between the periphery 17 of the plate 16 and the internal edge 25 of the ring 12 an interval 26 in a circular arc such that all the forces resulting from the application of external pressure to the edge 18 of the ring 12 are transmitted to the pellet 16 is a direction parallel to the plane of this pellet by the two bridges 22 and 23.

The top face 27 of the pellet 16 and its bottom face 28 have a radius of curvature toward the exterior designed so as to favor the trapping of the excitation energy of the vibrations of the pellet 16. On its periphery, the pellet 16 thins out. The bridges 22 and 23 (FIG. 1) allow the suspension of the pellet 16 on the inside of the ring 12.

Each of the caps 20 and 21 comprises, in its central part, hollow regions 30 and 31 defining chambers limited by the top and bottom faces 27 and 28 of the pellet 16 and communicating by the intervals 26. Inside these chambers are cut, in the blocks 20 and 21, projections 32 and 33 each having a concave terminal face with a radius of curvature substantially equal to that of the pellet 16, or simply flat and parallel to the plane of the pellet 10, this face being covered with an electrode 34 and 35. These electrodes are placed opposite the bulging faces 27 and 28 of the pellet 16 at a distance of a few microns.

Each of the electrodes 34 and 35 is connected to an excitation circuit, not shown, which makes it possible in a conventional manner to maintain vibration in the pellet 16 at a frequency which can be measured by the frequency of the electric signal used for the excitation of this vibration.

The vibration of a pellet such as 16 involves several modes, namely a quasi-longitudinal vibration mode, sometimes called mode A, and two quasi-transverse vibration modes orthogonal with respect to each other and with respect to mode A, also called modes B and C, in which the displacement of the particles takes place in a direction perpendicular to the energy transmission. One thus speaks of thickness shear vibrations for the modes B and C.

As regards their detection, these modes can be characterized by their frequencies, mode A corresponding to the fastest acoustic wave propagation rate, and mode C to the slowest.

In addition, it is possible, by suitable dimensioning techniques well known to those of the art, to favor the amplitude of one or several of these oscillatory modes at the expense of the others. In practice, the respective value of these modes depends first on the cut and on the radii of curvature of its top and bottom faces 27 and 28. It is known that quartz is an anisotropic material from both the optical and electrical viewpoints and has an optical axis Z and an electrical axis X, the angles defining a face in the quartz block being marked in relation to a right angle trihedral OXYZ in which the Y axis is orthogonal to the optical and electrical axes.

For a plate 40 taken as an example in FIG. 5, the cutting plane can be defined by the angle $\phi$ between the axes OX and OX", OX" being the trace of the plane of the plate in the OXY plane, and $\theta$ the angle between the axis OZ" perpendicular to OX" in the plane of the plate 40 and the optical axis OZ. In the plane of the plate, any direction 42 can be identified in azimuth $\psi$ by the angle it forms with the axis OX". When a cut involves two nonzero angles $\phi$ and $\theta$, for its definition, it is most often designated as a double-rotation cut. Vibrating pellets obtained according to such cuts offer the advantage of two quasi-transverse vibration modes B and C which are both utilizable within the framework of a pressure measurement according to the invention.

In general, each of the vibration modes of a pellet such as 16 can be characterized by the sensitivity of its resonance frequency to the application direction of a force F parallel to its plane, the direction of this force being identified by its azimuth $\psi$. In addition, each of these frequencies varies generally as a function of the temperature according to a second characteristic.

The coefficient of the sensitivity of the resonance frequency to the force is defined by the relationship:

$$K_F(\psi) = \Delta f/f_0 \times 1/F \cdot eD/N$$

in which $\psi$ is the azimuth of the force application direction;
F is the intensity of the applied forces;
e is the thickness of the resonator;
D is its diameter;
N is the frequency constant of the propagated wave; and
$\Delta f/f_0$ is the relative frequency variation corresponding to the application of the forces F.

As regards the relative variation of frequency as a function of temperature, it can be represented satisfactorily by means of a third degree polynomial $$\Delta f/f_0 = a(T - T_0) + b(T - T_0)^2 + c(T - T_0)^3 + \tilde{a}\frac{dT}{dt}$$

in which a, b and c are statistical coefficients and $\tilde{a}$ is a dynamic coefficient of the first order,
T is the temperature,
$T_0$ is a reference temperature and
$\tilde{a}\, dT/dt$ represents the transient effect during a time variation of T.

In FIG. 6, the curve 50 represents, the variation in sensitivity $K_F$ as a function of the azimuth $\psi$ of the application of the forces F of the transverse vibration mode C, i.e. the slow mode for a cut belonging to the SC (stress-compensated) family defined by angles $\theta = 33.93°$ and $\phi = 21.93°$. It is noted that this sensitivity curve has an approximately sinusoidal shape of period $\pi$. The corresponding curve for the fast transverse vibration mode (B) is represented at 60. It also has an approximately sinusoidal shape, but offset on the side of the positive values of $K_F$. These two curves 50 and 60 are offset in relation to each other so that if we consider the directions in a typical angular sector between 108° and 120° (shown crosshatched in FIG. 6), it is noted that the sensitivity values provided by the curve 50 (C) are near their absolute maximum value (negative sensitivity), whereas the corresponding values in mode B (curve 60) are near zero.

This observation is used according to the invention, in a plate 10 such as that of FIG. 2, to orient the axis of the bridges 22 and 23 so that the basic forces transmitted radially by these bridges to the pellet 16 in diametrically opposite directions form a range corresponding to an angular bridge width $\beta = 12°$, the bisectors of these bridges being aligned in a direction $\psi$ forming an angle of 116° with the direction X" and its complement at 360°, namely 294°.

With such a plate 10, the sensitivity $K_F$ of the pellet 16 to the forces transmitted under the effect of the pressure acting notably on the edge 18 of this plate is about $-1.1 \times 10^{-14}$ msec/N for the slow mode C. The corresponding frequency measurement however depends on the temperature according to the relationship defined above.

On the other hand, if the frequency is measured in mode B (curve 60), it is not influenced by the value of the pressure around the measurement casing. Its frequency variations are thus mainly dependent on the values of the temperature.

Referring to FIG. 9, an oil well 100 is shown comprising a production string 102 within which is lowered, at the end of a cable 104 connected to a measurement station 101 on the surface 122, a sonde 106 in which is mounted a device 107 comprising a transducer 108 according to the invention whose make-up is illustrated in detail in the dashed callout frame 107. The electrodes 109 and 110 of the transducer 108 are connected to an amplifier 111 tuned to the frequency $f_B$ of mode B and to an amplifier 112 tuned to the frequency $f_C$ of mode C. The outputs of these amplifiers are filtered in respective filters 113 and 114, and shaped in respective circuits 115 and 116. The output signal pulses of the circuits 115 and 116 are counted in counters 117 and 118 which give digital indications of $f_B$ and $f_C$ to a memory and processing circuit 120. This circuit, which may for example be based on a microprocessor, makes it possible to determine from $f_C$ a corrected value of the pressure measured as a function of the signal $f_B$ which is representative of the temperature.

With systems according to the invention, one achieves a relative stability of the frequency for the pressure measurement (mode C) of about $5 \times 10^{-11}$ for observation times on the order of a minute, and temperature measurement (mode B) on the order of about $10^{-9}$ under the same conditions.

For example, for a nominal mode C operating frequency ($f_O$) of 5 MHz, and considering its sensitivity to the forces, these stability values are sufficient to obtain low pressure measurements with a resolution of $7 \times 10^{-4}$ bars for a nominal pressure of 1360 bars.

Within a range from 0° C. to 200° C., the thermal sensitivity of the mode B in absolute value, which may be regarded equal to $25 \times 10^{-6}$ per degree Celsius as a first approximation, makes it possible to detect a variation of about $5 \times 10^{-4}$° C. for a frequency variation measurement of 0.05 Hz on 5.5 MHz. This frequency variation of mode B furnishes a sufficiently accurate temperature measurement to yield the desired accuracy for the measurement of forces and hence of pressures.

Hence, by a suitable choice of the force application line on the pellet 16 in relation to the crystallographic axis OX'' of the chosen cut, one obtains a combination of optimum measurements within which high sensitivity to pressure variations is combined with high accuracy in temperature measurement. This results from the fact that temperature measurement is directly derived from the crystal carrying out the pressure measurement.

In FIG. 2, the position of the bridges 22 and 23 have been represented aligned along an average diametrical line forming an angle $\psi$ of about 115° with the axis OX'' of the stress compensated cut according to which the pellet 16 is cut.

The relative positions of the curves 50 (C) and 60 (B) of FIG. 6 are in practice data corresponding to the chosen crystal cut, subject to what was stated earlier regarding certain adjustment parameters. It is thus possible to act notably on two factors for obtaining a pressure transducer according to the invention. One can first of all modify the number and the position of the application lines of the forces resulting from the pressure on the resonator pellet 16 by positioning and if necessary by increasing the number of bridges such as 22 and 23. In a four bridge embodiment, for example as represented in FIG. 8A, a pellet 16A is connected to a pressure application ring 12A by four bridges 52, 53, 54 and 55 aligned two-by-two. The alignment direction of the bridges 52 and 54 is defined by an angle $\psi_1$ which is chosen in the case of an SC cut equal to about 30°, the other bridges 53 and 55 being aligned in an azimuth direction $\psi_2$ of about 170°. In FIG. 6, the point 56 corresponds to the odd-order bridge line. It is observed that, for this point, the value of the mode C sensitivity is very close to the maximum ($1 \times 4.10^{-14}$ m.sec/N). The sensitivity corresponding to mode B corresponds to the ordinate of point 57, mainly $0.7 \times 10^{-14}$ m.sec/N. It is noticed that, for the azimuth direction $\psi_2$, the value of the mode C sensitivity is zero (see point 58 in FIG. 6). On the other hand, as illustrated by the ordinate of point 59, the mode B sensitivity is the opposite of that on point 57, namely $-0.7 \times 10^{-14}$ m.sec/N. Stress effects on mode B are thus cancelled.

It is also possible to adapt the position of the force application points by using three bridges (see FIG. 8B) 62, 63 and 64 between a pellet 16B and a ring 12B. The position of the bridge 62 is defined by an angle of azimuth $\psi_3$ corresponding to the bisector 65 of the angle $\beta$ of this bridge. The corresponding bisector 66 and 67 of each of the bridges 63 and 64 respectively are angularly spaced respectively by $\alpha_1$ and $\alpha_2$ in relative to the direction 65. In the general case of a three bridge arrangement, the angles $\alpha_1$ and $\alpha_2$ may be different. In the particular case represented in FIG. 8B, the angles $\alpha_1$ and $\alpha_2$ are both equal to a common value $\alpha$.

In FIG. 10A a network of sensitivity curves of the same type as that of FIG. 6 is represented assigned parameters according to the value of the angle $\alpha$ for a stress-compensated cut. Eight curves 500 (0°) to 500 (80°) one obtained for successive values $\alpha$ of 0°, 20°, 40°, 60°, 65°, 70°, 75° and 80° for mode C. For mode B, the curves 501 (70°), 501 (75°) and 501 (80°) respectively have been obtained for the values 70°, 75° and 80° of $\alpha$. The values 70° and 80° can correspond to the terminals of the circular arc of 10° (FIG. 10C) covered by each bridge 63 and 64, the average sensitivity of these bridges being represented by the curve 500 (75°) and 501 (75°) respectively for the modes C and B. It is noted that, for values of $\alpha$ reaching 70° and over, the sensitivity of mode C undergoes an increase in amplitude. This results from an increase in the shear stresses owing to the three point arrangement. In FIG. 10A have been located, between the pairs of lines 505 and 506 on the one hand and 507 and 508 on the other, the azimuth ranges capable of corresponding to the bridge 62 (FIG. 10C).

FIG. 8C illustrates another special case of a three-bridge embodiment in which the bridges 72 and 74 are diametrically opposite, in a direction defined by a line 75 of azimuth $\psi_4$. The third bridge 76 is arranged in a direction defined by an angle $\alpha_4$ in relation to the direction 75.

As in the case of FIG. 8B, it is possible in the case of FIG. 8C, to plot parametrized sensitivity diagrams as a function of $\alpha_4$ for the modes B and C. An optimum position of the directions of the bridges 75 and 76 can then be determined to maximize the mode C pressure sensitivity, on the one hand, and the insensitivity to this same parameter for the mode B so as to obtain a frequency variation depending essentially only on temperature.

It is of course possible to plot parametrized sensitivity diagrams as a function of values of angles $\alpha_1$ and $\alpha_2$ in the general case where the values of $\alpha_1$ and $\alpha_2$ in a three bridge arrangement are different.

The preceding discussion was conducted with reference to a stress-compensated (SC) cut (FIG. 6). The invention can also be implemented using other cuts and in particular, preferably, double-rotation cuts. FIG. 7 shows curves of sensitivity diagrams obtained for an RT (room temperature) cut in mode B and in mode C. It is noted that the sensitivity of this cut, particularly in mode B, goes through zero at a point located between 97° and 102° depending on the value of the angular parameter $\phi$ of the cut (line 82). The curves 503 and 504 represent respectively the curves representative of mode C in this cut for two values $\phi_1$ and $\phi_2$; the first cuts the axis of zero sensitivities, the other does not. With a diagram of this type, it is possible to obtain a good pair of measurements in modes B and C by means of four bridges aligned two-by-two in positions capable of eliminating the influence of pressure variation on mode B (for example, for values near 50° and 140° for $\psi$).

FIG. 10B gives an example of variations in the force sensitivity curves for an RT cut for a three bridge arrangement similar to that of FIG. 8B ($\alpha_1 = \alpha_2 = \alpha$) for different values of $\alpha$, respectively 68°, 72° and 76° for modes B (curves 510) and C (curves 511) (including $\alpha = 82°$). It is noted that for a suitable choice of $\alpha$ a high mode C sensitivity is obtained within a range of azimuth extending approximately from 171° to 201° (zones 512 and 513) with an almost zero mode B sensitivity (see FIG. 10D).

There are other suitable cut modes for a quartz crystal, for example the X +30° cut or the SBTC (stress-compensated for mode B, temperature-compensated for mode C). This latter cut can be used with diametrically opposite bridge pairs, such as the RT cut.

The angles defining these cuts are given below:

| | | |
|---|---|---|
| SC cut | $\theta = 33.93° \pm 2°$ | $\phi = 21.93° \pm 2°$ |
| X +30° cut | $\theta = 34° \pm 2°$ | $\phi = 30° \pm 2°$ |
| RT cut | $\theta = -34.5° \pm 2°$ | $\phi = 15° \pm 2°$ |
| SBTC cut | $\theta = -34.5° \pm 2°$ | $\phi = 16.3° \pm 2°$ |

In Table I below are summarized mounting examples for resonator pellets such as 16 providing suitable measurements for the application of the invention. For each type of crystal cut considered, the number of bridges has been indicated; 2 (FIG. 2), 4 (FIG. 8A), 2+1 (FIG. 8C) or 3 (FIG. 8B), along with the value of the angle (s) defining the azimuth of the bridges as well as the value of the angles defined previously.

Finally, the angular opening of each bridge has been defined by $\beta$. It is noted that, in the case of three-bridge combinations of the type represented in FIG. 8B, the angular width of the bridge 62 is twice that of the bridges 63 and 64.

TABLE I

| Number of bridges | 2 | 4 | (2+1) | 3 |
|---|---|---|---|---|
| SC cut | $\psi = 118°$ | $\psi_1 = 33°$ | $\psi_4 = 118°$ | $\psi_3 = 30°$ |
| | $\beta = 30°$ | $\psi_2 = 173°$ | $\alpha_4 = 40°$ | $\alpha_1 = \alpha_2 = 75°$ |
| | | ($\beta \# 20°$) | | $\beta = 30°/\beta' = 15°$ |
| X + | $\psi = 108°$ | $\psi_1 = 85°$ | $\psi_4 = 103°$ | $\psi_3 = 23°$ |
| 30° cut | $\beta = 30°$ | $\psi_2 = 132°$ | $\alpha_4 = 40°$ | $\alpha_1 = \alpha_2 = 75°$ |
| | | ($\beta \# 20°$) | | $\beta = 30°/\beta' = 15°$ |
| RT | NO | $\psi_1 = 15°$ | NO | $\psi_3 = 6°$ |
| (+SBTC) | | $\psi_2 = 106°$ | | $\alpha_1 = \alpha_2 = 75°$ |
| | | | | $\beta = 30°/\beta' = 15°$ |

Coming back to FIGS. 1 and 2, the transducer represented is designed according to the BVA technique. In particular, the electrodes 34 and 35 instead of being placed directly on the faces of the vibrating pellets 16 are obtained by the metalization of the projections 32 and 33, which allows the surface finish of the pellet to be left untouched, avoids the migration of metallic ions in the vibrating crystal and minimizes hysteresis phenomena. Of course this is a preferred embodiment simplified method with a direct deposit on the faces of the crystal is also possible. The blocks 20 and 21 have the same crystal cut as the plate 10. The assembly is designed so that the crystal works under compression under the effect of the external pressure to be measured. In general, the construction features of the transducer are determined in order to minimize variations in its own resonance frequency under the effect of aging. The enclosure 31, within which the pellet 16 vibrates, is placed under a secondary vacuum.

FIG. 3 represents another embodiment of the transducer in which a plate 210, constituted substantially in the same manner as the plate 10 of FIGS. 1 and 2 and having two bridges 222 and 223 to connect a vibrating pellet 216 to a force transmission ring 212, is mounted between two crystal caps 230 and 240 of cylindrical form closed on one of their ends by a face such as 232 for the cap 230. At their opposite ends, the caps 230 and 240 are hollow and are assembled by gluing (or by thermocompression) with the respective faces of the annular ring 212, each by an annular face such as 243 for the cap 240. The electrodes of the resonator 210 are, in the case of FIG. 3, directly deposited by metalization on each of the faces of the pellet 216 as can be seen for the electrode 234. This electrode is connected to the exterior of the casing formed by the assembly of the caps 230 and 240 and the plate 210 by a metalization 235 extending up to the periphery of the external face 219 of the plate, capable of receiving the pressure. The ends or caps 230 and 240 can also be designed in a pseudo-spherical form.

In FIG. 4, a transducer casing 300 seen in diametrical longitudinal section comprises an elongated, hollow, cylindrical body 310 in the center of which is formed in unitary construction a transverse resonator pellet 316 with upper and lower faces 317 and 318 bulging to trap the energy. The body member 310 exhibits, in longitudinal section, an H-shape section. The two ends of the cylindrical casing 310 are closed by caps, respectively 320 and 330, also of cylindrical form that are applied by gluing or thermocompression against the upper and lower parts of the casing 310 via annular faces 322 and 332 respectively. At their other ends the caps 320 and 330 are closed by a partition respectively 323 and 333. With the bottom of this partition 323, 333 is associated a block respectively 324, 334 having a transverse opposite face 325, 335 which is placed opposite the respective bulging face 317, 318 of the pellet 316 and on which is deposited a metalization forming an electrode. The height of the casing 310 is chosen such that the shear stresses in the joint planes 322 and 332 are minimized. The pellet 316 is connected to the main body of the casing 310 by two diametrically opposite bridges 311 and 312 made in a manner similar to the bridges previously described and, in particular, positioned with respect to the crystallographic axis of the cut in which the crystal of the casing is cut so as to obtain the desired effects mentioned earlier. The pellet 316 can also be connected to the body of the casing 310 by more than two bridges (for example three or four bridges) in accordance with the explanations given earlier. The caps 320 and 330 are cut according to the same cut as the body 310. The assembly of the cylinder 310 and the caps 320 and 330 is calculated according to the thin shell theory so that, at all points, the casing works under compression under the effect of the external pressure. In the structure represented in FIG. 4 there is an amplification effect for the variations in the stress applied to the vibrating pellet 316 under the effect of the pressure variations making it possible to improve the sensitivity of the device. The enclosure formed inside the casing 310 and the caps 320 and 330 is evacuated or filled with helium or another inert gas.

Figure 11:
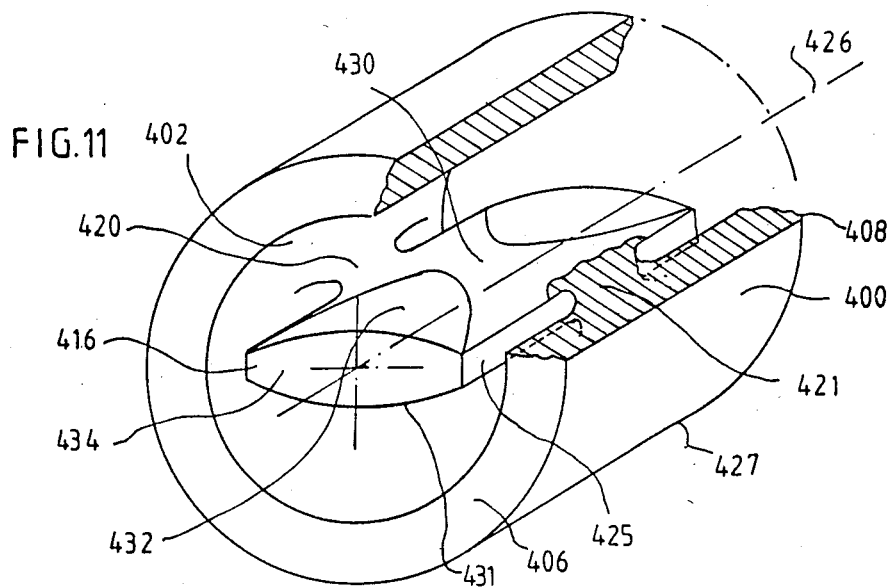
FIG. 11 represents another embodiment of the transducer.

The invention is not limited to circular vibrating pellets. It is possible for example to use rectangular pellets. An example of an embodiment is given in FIG. 11. A cylindrical casing 400 is cut in a quartz crystal as a single piece with a rectangular plate 416 parallel to a plane passing through the axis of the cylindrical casing 400. The longitudinal sides 425 of the plate 416 are connected by bridges 420 and 421 to the internal face 402 of the cylinder 400. These bridges are located at about half the longitudinal dimensions of the plate 416 and are aligned in a direction transverse to the axis 426 of the cylinder 400. The crystal cut in which the assembly of FIG. 11 is formed is selected so that the transverse alignment direction of the bridges 420 and 421 forms a previously selected azimuth angle with the crystallographic axis of the cut parallel to which the plate 416 extends, this angle being chosen on the basis of the considerations indicated earlier. The top and bottom faces 430 and 431 of the plate 416 have a cylindrical bulge in their central part and are slightly bevelled at 432, thinning in the direction of the terminal faces such as 434 of the plate thus formed. The annular ends, respectively 406 and 408, of the hollow cylinder 400 can be closed by simple glued pellets, not shown, in order to allow the maintaining of a high vacuum inside the internal cavity of the cylinder. With these pellets can be associated tongues which advance in the cylinder 400 and carry electrodes in the immediate vicinity of the faces 430 and 431 to cause and to maintain the vibration of the plate 416. When a pressure is applied on the outside 427 of the casing 400, equal and opposite forces are transmitted through the internal wall of the casing to the plate 416 in a plane parallel to the latter and along a direction perpendicular to the axis 426. The amplitude of these forces for a given pressure can be adjusted by the longitudinal dimensions of the bridges 420 and 421. The longitudinal dimension of the plate 416 in this example is slightly smaller than that of the cylindrical body 400.

Although the preferential embodiments just described are made by means of quartz, the principles of the invention would be applicable to other piezoelectric materials of the same crystallographic class as quartz, notably to materials capable of vibrating according to two transverse thickness shear vibration modes.

We claim:

1. A piezoelectric transducer for making temperature-corrected measurements of an applied pressure, comprising:

a block of piezoelectric material having an external portion including a surface to which a pressure to be measured can be applied, a resonator pellet separated from the external portion by an interval, and a plurality of bridges connecting the external portion with the resonator pellet for transmitting forces to the resonator pellet corresponding to the pressure being applied at the surface;

means for isolating the resonator pellet from direct action of the applied pressure; and electrode means for causing the resonator pellet to vibrate and for measuring the frequency of vibration of the resonator;

the resonator pellet being cut with a crystallographic cut having first and second vibration modes, and the bridges being arranged to transmit forces to the resonator pellet along a plane substantially parallel to the plane of the cut in directions whose azimuths are selected in relation to the crystallographic axis of the cut so that the sensitivity of the resonance frequency of the resonator pellet to the transmitted forces is high in the first vibration mode and practically zero in the second vibration mode.

2. A transducer as in claim 1, wherein the first vibration mode of the resonator pellet is the quasi-transverse vibration mode whose acoustic wave propagation rate is the lowest.

3. A transducer as in claim 1, wherein the external portion of the block of piezoelectric material comprises an annular section parallel to the plane of the resonator pellet, and wherein the resonator pellet is positioned within the annular section.

4. A transducer as in claim 3, wherein the resonator pellet has a generally planar circular form and the bridges are arranged peripherally of the pellet.

5. A transducer as in claim 1, wherein there are two bridges which transmit forces in opposite directions to the resonator pellet.

6. A transducer as in claim 1, wherein there are four bridges which transmit forces in directions aligned two-by-two, with the force sensitivity in the first vibration mode being near a maximum in one of the directions and near zero in the other, and with the force sensitivity in the second vibration mode being substantially equal and opposite in both directions.

7. A transducer as in claim 1, wherein there are three bridges.

8. A transducer as in claim 7, wherein the bridges are arranged so that two of the bridges transmit forces to the pellet in directions that are symmetrical with respect to the direction of transmission of forces by the third bridge, and wherein the direction of transmission of forces by the third bridge corresponds to zero force sensitivity in one of said first and second modes.

9. A transducer as in claim 8, wherein the combined width of the first two bridges is substantially equal to the width of the third bridge.

10. A transducer as in claim 7, wherein two of the bridges are arranged in diametrically opposed relationship relative to the center of the resonator pellet.

11. A transducer as in any of claims 5 through 7, wherein the crystallographic cut is an SC cut or an x +30° cut.

12. A transducer as in any of claims 5 through 7, wherein the crystallographic cut is an RT cut or an SBTC cut.

13. A transducer as in claim 1, wherein the pellet has top and bottom faces and wherein the electrode means comprises two electrodes, positioned so that one electrode is a short distance away from each face of the pellet.

14. A transducer according to claim 1, wherein the block of piezoelectric material is in the form of a plate, the external portion having upper and lower faces annularly surrounding the resonator pellet; and wherein the means for isolating the resonator pellets comprises two hollow caps placed with one cap over each of the upper and lower faces, the hollow regions of the caps serving to confine the resonator pellet in a cavity in which a vacuum can be created.

15. A transducer according to claim 14, wherein the caps have substantially hemispherical external shapes with their diametral planes providing rings in contact with the respective upper and lower faces of the external portion.

16. A transducer according to claim 1, wherein the external portion of the block of piezoelectric material is in the form of an elongated hollow cylinder having faces at the ends thereof, wherein the resonator pellet is transversely positioned within the middle part of the external portion, and wherein the means for isolating the resonator pellet comprises caps applied against the respective end faces of the external portion.

17. A piezoelectric transducer for use in an environment in which it is subjected to variable temperatures and externally applied stresses, comprising:
- a block of piezoelectric material having an external portion including a surface sensitive to the application of externally applied stress, a resonator pellet separated from the external portion by an interval, and a plurality of bridges connecting the external portion with the resonator pellet for transmitting forces to the resonator pellet corresponding to the externally applied stress;
- means for isolating the resonator pellet from direct action of the externally applied stress; and
- electrode means for causing the resonator pellet to vibrate and for measuring the frequency of vibration of the resonator;
- the resonator pellet being cut with a crystallographic cut having at least two vibration modes whose frequency is sensitive to the direction of application of forces to the resonator pellet, and the bridges being arranged to transmit forces to the resonator pellet along a plane substantially parallel to the plane of the cut under the effect of the externally applied stresses in directions whose azimuths are selected in relation to the crystallographic axis of the cut or its projection, so that the sensitivity of a resonance frequency of the resonator pellet to the transmitted forces in one of the vibration modes is practically zero.

18. A transducer as in claim 1 or 17, wherein the resonator pellet has a thickness that thins out near the bridges.

19. A transducer as in claim 7, wherein the angles defining the arrangement of the bridges relative to each other are selected to maximize the sensitivity of the resonator pellet to forces in the first mode of vibration.

* * * * *